United States Patent
Pareek

(10) Patent No.: US 10,163,097 B2
(45) Date of Patent: Dec. 25, 2018

(54) METHOD AND SYSTEM FOR CONTACTLESS FINANCIAL TRANSACTIONS

(71) Applicant: MasterCard International Incorporated, Purchase, NY (US)

(72) Inventor: Ravi Pareek, Pune (IN)

(73) Assignee: Mastercard International Incorporated, Purchase, NY (US)

(*) Notice: Subject to any disclaimer, the term of this patent is extended or adjusted under 35 U.S.C. 154(b) by 182 days.

(21) Appl. No.: 15/221,850

(22) Filed: Jul. 28, 2016

(65) Prior Publication Data

US 2017/0053265 A1    Feb. 23, 2017

(30) Foreign Application Priority Data

Aug. 18, 2015    (SG) .............................. 10201506519S

(51) Int. Cl.
G06Q 20/34    (2012.01)
G06Q 20/40    (2012.01)

(52) U.S. Cl.
CPC .......... *G06Q 20/352* (2013.01); *G06Q 20/40* (2013.01)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | | |
|---|---|---|---|---|
| 7,865,446 B2* | 1/2011 | Armingaud | ......... | G06F 21/6245 705/16 |
| 8,355,982 B2* | 1/2013 | Hazel | ..................... | G06Q 20/04 705/35 |
| 8,583,496 B2* | 11/2013 | Yoo | ........................ | G06Q 20/10 705/17 |
| 2006/0212407 A1* | 9/2006 | Lyon | ..................... | G06Q 20/04 705/71 |

(Continued)

OTHER PUBLICATIONS

"Security, Privacy and Financial Transactions Greater Giving Products and Services", Greater Giving 1920 NW Amberglen Pkwy Suite 140, Beaverton OR 097006 . . . (Year: 2016).*

*Primary Examiner* — Frantzy Poinvil
(74) *Attorney, Agent, or Firm* — Buckley, Maschoff & Talwalkar LLC

(57) ABSTRACT

A method and system are proposed for financial purchase transactions between a merchant and an employee in possession of a contactless credential device such as a proximity card ordinarily used for access to commercial facilities as in the case of electronically controlled doors and the like. The merchant is provided with a contactless reader device adapted to discern credential device codes. In response to presentation of the credential device at the merchant reader device for the purposes of a financial purchase transaction, the credential device code is discerned using the merchant reader device, the credential device code, together with details of the financial purchase transaction, is electronically communicated to a transaction facilitator, a credit/debit account corresponding to said employee is identified according to a stored database correlation with the credential device code, and the financial purchase transactions details are processed against the identified credit/debit account in order to authorize the financial purchase transaction.

13 Claims, 3 Drawing Sheets

(56) References Cited

U.S. PATENT DOCUMENTS

| | | | |
|---|---|---|---|
| 2007/0255653 A1* | 11/2007 | Tumminaro | G06Q 20/10 705/39 |
| 2009/0055319 A1* | 2/2009 | Raheman | G06Q 20/20 705/44 |
| 2012/0066120 A1* | 3/2012 | Ringewald | G06Q 20/102 705/40 |
| 2012/0173348 A1* | 7/2012 | Yoo | G06O 20/10 705/16 |
| 2012/0221472 A1* | 8/2012 | Erikson | G06Q 20/10 705/44 |
| 2012/0239577 A1* | 9/2012 | Wolfs | G06Q 20/32 705/64 |
| 2013/0066782 A1* | 3/2013 | Diamond | G06Q 20/04 705/44 |
| 2014/0058862 A1* | 2/2014 | Celkonas | G06Q 20/12 705/18 |
| 2015/0120472 A1* | 4/2015 | Aabye | G06Q 20/36 705/16 |

\* cited by examiner

METHOD AND SYSTEM FOR CONTACTLESS FINANCIAL TRANSACTIONS

CROSS-REFERENCE TO RELATED APPLICATION

This application is a U.S. National Stage filing under 35 U.S.C. § 119, based on and claiming benefit of and priority to SG Patent Application No. 10201506519S filed Aug. 18, 2015.

FIELD OF THE INVENTION

The present invention relates to methods and systems for contactless financial transactions.

BACKGROUND

It is customary in many business environments for an organisation to provide each employee with a credential device, usually in the form of a card, badge, fob, tag or the like, that can be easily carried or worn by the employee. The credential device typically includes some form of machine readable code, and may also include some form of visual identification. The credential device can be used to enable the employee to gain access to controlled commercial resources and facilities. For example, it is common for commercial premises to have doors with access control responsive to the machine readable codes of credential devices issued by the company. Such systems provide the employer organisation with a high degree of flexibility in access control, but generally require the employees to carry their credential device with them throughout the day.

Modern credential devices are frequently of the type known as 'proximity cards' or 'proximity devices'. Proximity devices are widely used in a variety of applications such as to control access to commercial facilities. In this type of application, a user positions the proximity device proximate to a detector circuit. The detector circuit reads the identification code of the proximity device by way of radio-frequency signals in order to determine the identity of the user. If the user is authorized to gain access, the detector circuit actuates a door lock mechanism. If the user is not authorized, the detector circuit will deny access. Proximity devices make the access control functions relatively convenient for the employees, in fact somewhat more convenient than conventional alternatives such as a traditional key or set of keys.

Throughout the course of a working day it is usual for an employee to carry their personal credential device with them constantly for use at controlled doors into and within the commercial premises, elevators, parking lots and other facilities. For ease of use the credential device may be carried on a lanyard, or clipped or otherwise attached to the user's clothing, by way of example. Thus, during the working day the credential device is one item, above all others, that may employees would have with them at all times.

SUMMARY OF THE INVENTION

Embodiments of the present invention seek to provide a method and system to allow an employee credential device to be utilized for additional functionality, specifically to enable the proximity device ordinarily used in access control to be used for contactless financial transactions.

In general terms the present invention enables an employee credential device, ordinarily used for access to facilities such as electrically controlled doors, to be additionally used for contactless purchases at participating merchants.

In one form, the invention provides a method for financial purchase transaction between a merchant and an employee in possession of a contactless credential device. The merchant is provided with a contactless reader device adapted to discern credential device codes. In response to presentation of the credential device at the merchant reader device for the purposes of a financial purchase transaction, the credential device code is discerned using the merchant reader device, the credential device code, together with details of the financial purchase transaction, is electronically communicated to a transaction facilitator, a credit/debit account corresponding to said employee is identified according to a stored database correlation with the credential device code, and the financial purchase transactions details are processed against the identified credit/debit account in order to authorise the financial purchase transaction.

In another form, the invention provides a system for contactless financial purchase transactions for use with a plurality of individually coded credential devices issued to employees for providing access to commercial facilities. The system includes a reader device located at a merchant, the reader device adapted to discern a credential device code when presented in the proximity thereof by a said employee for the purposes of a financial purchase transaction. A transaction facilitator computing apparatus is in remote communication with the reader device for receiving the credential device code discerned by the reader device together with financial purchase transaction details provided by the merchant, the transaction facilitator computing apparatus including a database storing correlation information between individual credential device codes and credit/debit account numbers. The transaction facilitator computing apparatus is adapted to: communicate with the merchant reader device to obtain a credential device code and corresponding financial purchase transaction details; translate the credential device code into a credit/debit account number through use of said database; and communicate the credit/debit account number together with the financial purchase transaction details to a credit/debit account issuer for transaction authorisation.

In another form, the invention provides a method for enabling a contactless credential device for use in financial transactions, wherein the contactless credential device includes a stored code number, the method comprising: generating a unique identification code for the credential device; registering the credential device code number and unique identification code in a database together with a credit/debit account number; and providing a merchant with a contactless reader device adapted to read the credential device stored code number. In response to presentation of the credential device at the merchant reader device for the purposes of a financial transaction, the method includes: communicating the credential device stored code number read by the reader device, together with financial transaction details, to a transaction facilitator; retrieving the unique identification code and/or credit/debit account number corresponding to the stored code number from the database; and communicating the retrieved unique identification code and/or credit/debit account number, together with the financial transaction details, to a credit/debit account issuer for transaction authorisation.

In another form, the invention provides a transaction facilitator computing apparatus for facilitating contactless financial purchase transactions involving a plurality of individually coded credential devices issued to employees for providing access to commercial facilities;

the transaction facilitator computing device having:
(a) an interface for remote communication with a reader device located at a merchant, the reader device being adapted to discern a credential device code when presented in the proximity thereof by an employee for the purposes of a financial purchase transaction, and
(b) a database storing correlation information between individual credential device codes and credit/debit account numbers;

wherein the transaction facilitator computing apparatus is adapted to:
receive from the reader device the credential device code discerned by the reader device together with financial purchase transaction details provided by the merchant;
translate the credential device code into a credit/debit account number through use of said database; and
communicate the credit/debit account number together with the financial purchase transaction details to a credit/debit account issuer for transaction authorisation.

In another form, the invention provides a method performed by a transaction facilitator computing apparatus for facilitating contactless financial purchase transactions involving a plurality of individually coded credential devices issued to employees for providing access to commercial facilities;

the transaction facilitator computing device having:
(a) an interface for remote communication with a reader device located at a merchant, the reader device being adapted to discern a credential device code when presented in the proximity thereof by an employee for the purposes of a financial purchase transaction, and
(b) a database storing correlation information between individual credential device codes and credit/debit account numbers;

the method including the steps of the transaction facilitator computing apparatus:
receiving from the reader device the credential device code discerned by the reader device together with financial purchase transaction details provided by the merchant;
translating the credential device code into a credit/debit account number through use of said database; and
communicating the credit/debit account number together with the financial purchase transaction details to a credit/debit account issuer for transaction authorisation.

In another form, the invention provides a reader device for location at a merchant, the reader device being adapted to:
discern, upon the presentation to the proximity of the reader device of one of a plurality of individually coded credential devices issued to employees for providing access to commercial facilities, a corresponding credential device code,
verify that the credential device code is in a predefined format of codes stored on said credential devices, and
if the verification is positive, to transmit the credential device code together with financial purchase transaction details, to a remote transaction facilitator computing apparatus for initiating a payment using the credential device code and the financial purchase transaction details.

In another form, the invention provides a method performed by a reader device located at a merchant, the method including the reader device:
discerning, upon the presentation to the proximity of the reader device of one of a plurality of individually coded credential devices issued to employees for providing access to commercial facilities, a corresponding credential device code,
verifying that the credential device code is in a predefined format of codes stored on said credential devices, and
if the verification is positive, transmitting the credential device code together with financial purchase transaction details, to a remote transaction facilitator computing apparatus for initiating a payment using the credential device code and the financial purchase transaction details.

The system and method of the invention in its embodiments may provide numerous advantages and benefits for merchants, employer organisations, and employees:

Merchants
  Merchants can provide customized discounts/packages for chosen employers.
  The merchants experience enhanced security as many credential devices (access cards) also have a photograph and/or other identification of the employee, providing an additional layer of authentication.
  The merchants may receive other benefits, such as those in the PayPass™ system offered by MasterCard International Inc. One of the functionalities provided by PayPass is PayPass Contactless which allows a payment transaction to be made quickly and simply just by touching a contactless credential device to a reader device. This functionality may be provided in an embodiment of the present invention, and this can reduce the staffing costs incurred by the merchant compared to a conventional payment card transaction.

Employer
  The employer can provide an enhanced experience to their employees, in which their employees can make transactions more easily and quickly without carrying an additional payment card.
  The employer is perceived as a technology savvy organization.
  The employment may be able to negotiate with merchants to provide good merchant tie-up offers when the credential device is used with the merchant.
  There is no additional cost for providing this service to their employees.
  The employer could provide the use of an embodiment of the invention as an option to employees rather than mandating them to use it.
  The employer can use an embodiment to help integrate e-commerce web-sites, enabling employees to use their employer log ins for e-commerce transactions.

Employee/Customer
  The employee/customer has no need to carry wallets/cards for purchases, only access card being sufficient.
  The employee/customer may not be exposed to any additional cost compared to existing systems for enrolling with this service and can opt-out when needed.
  The employee/customer may gain additional security as this is not directly linked to the bank account and only linked to the card and the actual card number would not be passed for transaction
  The employee/customer may gain other benefits, such as those arising in the PayPass™ services (e.g. quick and easy payment by touching the credential device to a reader device at a merchant).

BRIEF DESCRIPTION OF THE DRAWINGS

The invention may be better understood from the following detailed description of an embodiment thereof, presented by way of example only, which makes reference to the accompanying drawings, wherein.

DETAILED DESCRIPTION

Figure 1:
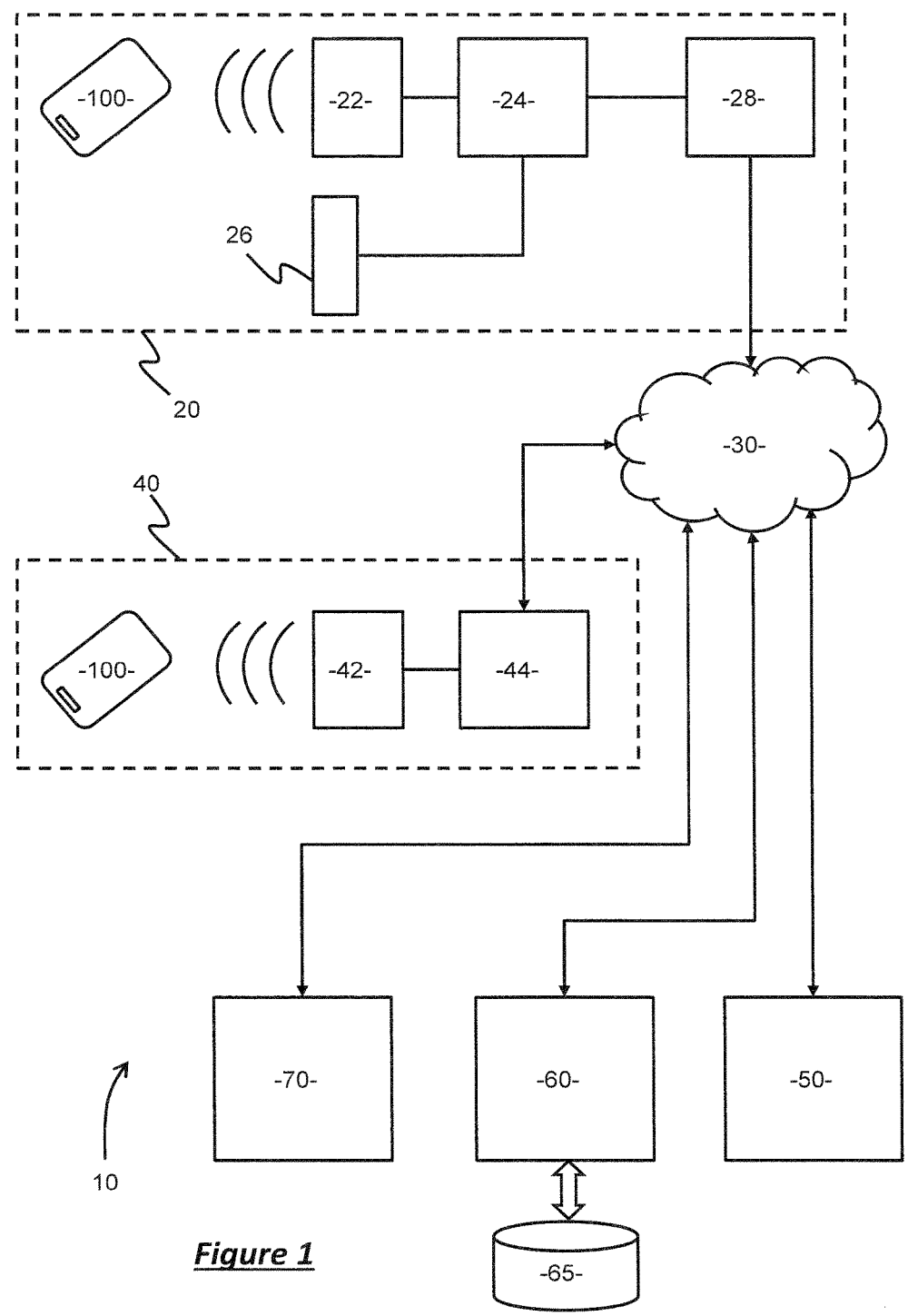
FIG. 1 is a block diagram illustration of a system according to an embodiment of the invention in which a proximity card credential device is capable of contactless financial transactions as well as access control functions.

A system 10 for implementation of an embodiment of the present invention is illustrated in the form of a block diagram in FIG. 1. The system enables a user to utilise their individual credential device both for its ordinary purpose of gaining access to commercial facilities (e.g. unlocking access controlled doors), as well as for conducting contactless financial transactions (e.g. buying merchandise). For the purposes of the following description the credential device will be referred to as a 'access card' 100, but in practice may be in the form of a card, badge, fob or other physical manifestation. The access card comprises a proximity device that includes a coil antenna coupled to internal circuitry, and is adapted to wirelessly communicate with a reader circuit when located in the proximity thereof.

Access cards are widely used in commercial settings, for example to control employee access to corporate facilities. Typically a company may issue each relevant employee with their own unique access card, which can also be printed with identification information such as employee name, position, photograph, etc. Each access card carries a unique identification code that can be wirelessly communicated to the reader circuit when in the proximity thereof. For the purposes of access control, the company maintains a database of each employee and their corresponding access card code, and the database may specify which corporate facilities each employee is entitled to access.

An exemplary access control system for a corporate facility is illustrated at 20 in FIG. 1. When the employee presents their access card 100, a card reader circuit 22 communicates wirelessly with the access card by way of a radio-frequency (RF) interface so as to elicit the access card code. The card reader circuit 22 may be positioned, for example, next to an access controlled door to the corporate premises, wherein the lock on the door is actuated by an electrically controlled door latch 26. Operation of the door latch 26 is controlled by a control circuit 24 which is coupled to the card reader circuit 22 as well as a corporate security server 28.

The security server 28 includes a database of access card codes. Each database record reflects the relationship between an access card code and the employee to which the corresponding access card has been issued. The database record further includes particulars of access privileges for the employee. For example, a given employee may be permitted access through some controlled doors, but not others.

In use, when the employee presents access card 100 to the card reader 22, the access card code is provided to the control circuit 24. The control circuit 24 communicates the access card code to the security server 28 which consults the corresponding database record. If the access privileges for that employee include the door at which the card reader 22 is located, then the control circuit 24 activates the door latch 26 and permits the employee access. Access cards, card readers and systems of the kind described above are available from HID Corporation, for example, from which further detailed information about the components and functions are available.

The exemplary system 10 is constructed to enable the access card 100 to additionally be used for contactless financial transactions, as described hereinbelow. Item 40 in FIG. 1 represents a retail merchant such as a store, café or the like. The retail merchant 40 is provided with a card reader 42, similar in nature to the card reader 22 used for access control. The card reader 42 may be integrated with other card reading apparatus, such as a PayPass™ terminal, or may be a 'stand-alone' device. The card reader is coupled for communication with a merchant controller 44 in the form of a computing device adapted for communication via the internet (30). As also seen in FIG. 1, the security server 28 is adapted for internet communications. The system 10 as shown in FIG. 1 further includes an issuer bank computer 50, a merchant bank computer 70, and a transaction facilitator computer 60 having a database 65. The issuer, merchant and transaction facilitator computers are each also adapted for internet communications. The manner in which the system 10 is operable to enable provision of contactless financial transactions is described below with reference also to FIGS. 2 and 3.

Figure 2:
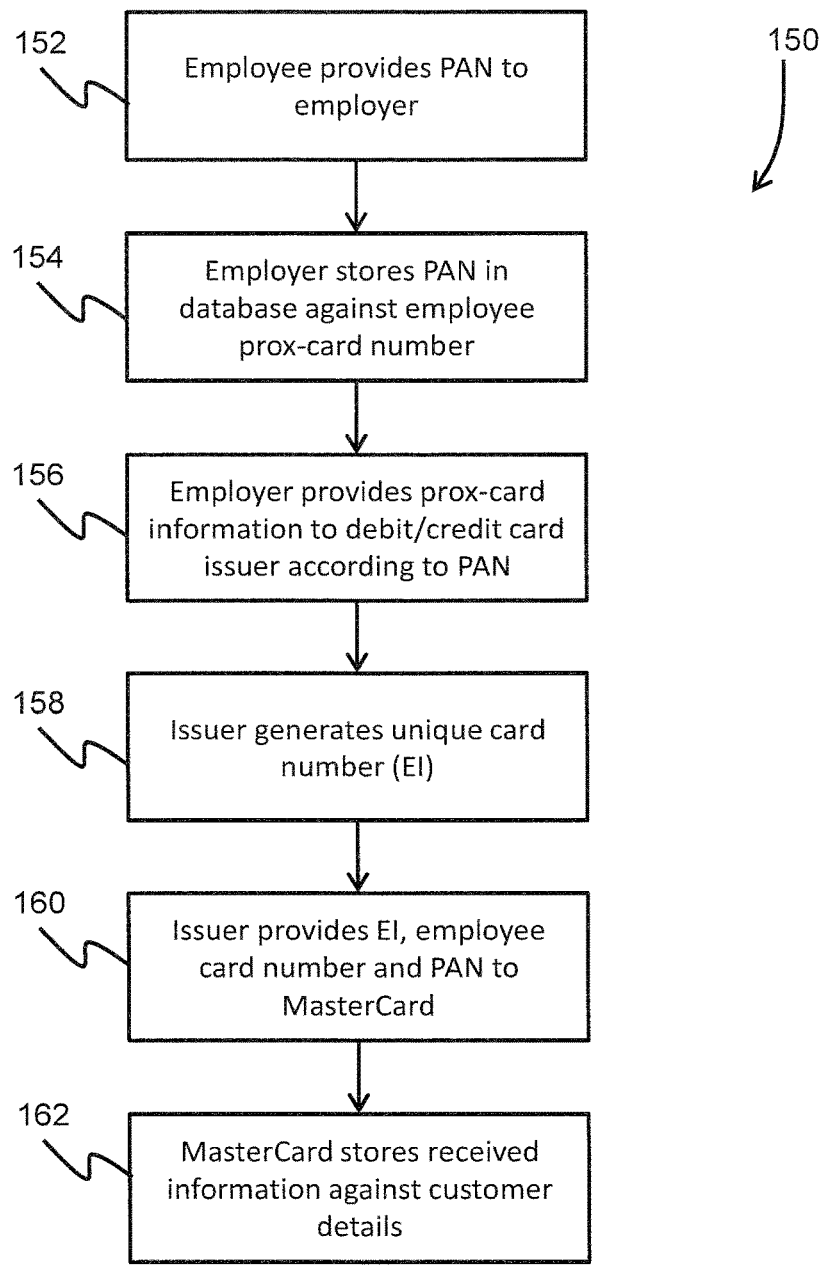
FIG. 2 is a flow chart diagram of a method for establishing the conditions for contactless financial transactions according to an embodiment of the invention.

FIG. 2 is a flow chart diagram illustrating a set-up procedure 150 according to an embodiment of the present invention. The set-up procedure 150 includes operations in the system 10 needed to establish the conditions for the access card 100 to be used for contactless financial transactions according to the embodiment.

In the first operation 152 of procedure 150, the employee to whom the access card 100 has been allocated provides a primary account number (PAN) to the employer. The PAN represents a debit or credit card account held by the employee. Then, at operation 154, the employer stores the employee PAN in the security server database record corresponding to the access card 100.

In operation 156 the employer provides the employee PAN and identification code for access card 100 to the debit/credit card issuer computer 50. The debit/credit card issuer then updates the employee's account details, and generates a unique card number EI (operation 158). The EI number may be formulated from a combination of:

Issuer BIN range
Access card manufacturer information
Employer identifier
Employee access card code number
A unique sequence number In operation 160 the debit/credit card issuer computer 50 then communicates the EI number, the employee access card code, and the employee PAN to the transaction facilitator computer 60. The information is stored (operation 162) in a look-up database 65. The transaction facilitator may comprise, for example, a payment network such as MasterCard™.

Figure 3:
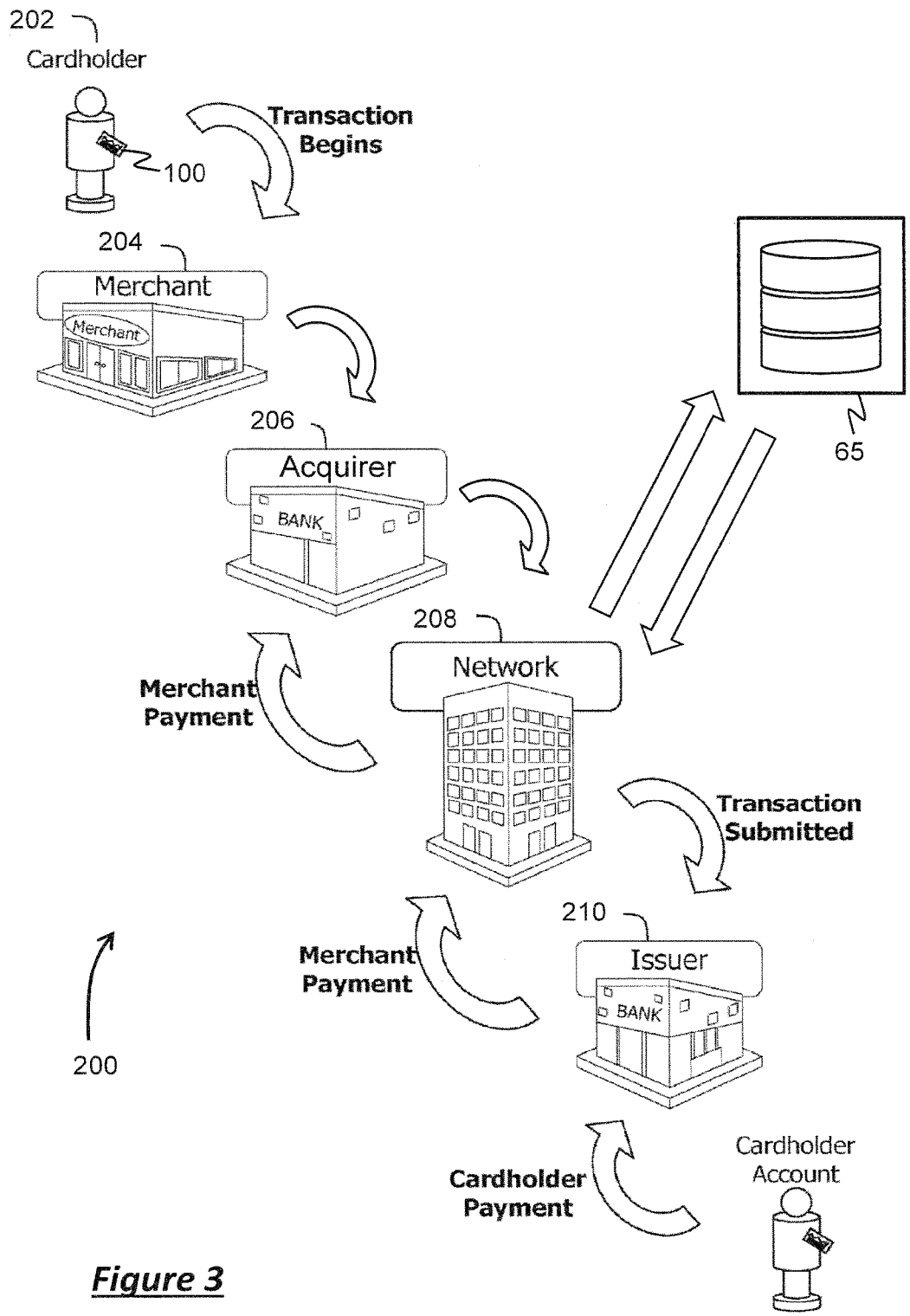
FIG. 3 is a diagrammatic illustration of the process involved in conducting a financial transaction according to an embodiment of the invention.

Once the set-up procedure has been completed the employee is able to use their access card for contactless financial transactions, as described below with reference to the diagrammatic illustration in FIG. 3. FIG. 3 illustrates a transaction procedure 200 beginning with the cardholder 202 presenting the access card 100 at a merchant 204 for the purpose, for example, of purchasing goods or services. The merchant 204 is equipped with a card reader 42 capable of contactless interface with the access card 100. The cardholder places the access card 100 in the proximity of the card reader at the merchant location, and the card reader 42 discerns the code number stored on the access card 100.

In the following paragraphs we describe steps which are performed in the procedure 200 using the access card code stored on the access card 100. However, note that optionally, the merchant card reader 42 may additionally be operative to read data from other credential devices, such as a conventional payment card used in the Pay-Pass™ system, so that, as noted above, the card reader 42 can function as a conventional Pay-Pass™ terminal. If so, the merchant card reader may be operative to verify whether data it receives is in the format stored on a conventional payment card, or is alternatively is in the format of the code number stored on the access card 100. In the case that the merchant card reader 42 determines that the data it received is in the format of a conventional payment card, it may initiate a payment transaction process such as the payment process used in the Pay-Pass™ system. Alternatively, if the merchant card reader 42 verifies that data it received is in the format of the code number stored on the access card 100, the following steps are performed.

The merchant card reader 42 passes the access card code, via internet communications, to the merchant bank (Acquirer 206) along with other payment details such as the dollar amount of the purchase. The Acquirer 206 routes the captured information to the transaction facilitator (Network 208), also via internet communications.

As described above, the transaction facilitator maintains a database (65) containing registered access card codes, unique EI numbers and employee PAN's. Using the access card code provided by the Acquirer 206, the Network 208 consults the database 65 to determine the corresponding Issuer and EI number. The Network 208 sends the EI details along with purchase information to the Issuer 210 (i.e. the credit/debit card issuer of the cardholder's primary account). The Issuer 210 uses the EI to identify the corresponding PAN to determine whether the cardholder's account is in good standing and whether the amount of the purchase is covered by the account's available credit/debit limit. Based on this determination the Issuer 210 communicates a transaction authorisation code to the merchant bank (Acquirer 206), and the transaction thereafter proceeds according to known protocols. This generates a debit to the cardholder account, and some time later the cardholder has to arrange a payment to the issuer bank to balance this debit.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer and for that matter, any commercial processor may be used to implement the embodiments of the invention either as a single processor, serial or parallel set of processors in the system and, as such, examples of commercial processors include, but are not limited to Merced™, Pentium™, Pentium II™, XeOn™, Celeron™, Pentium Pro™, Efficeon™, Athlon™, AMD™ and the like), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML. Moreover, there are hundreds of available computer languages that may be used to implement embodiments of the invention, among the more common being Ada; Algol; APL; awk; Basic; C; C++; Conol; Delphi; Eiffel; Euphoria; Forth; Fortran; HTML; Icon; Java; Javascript; Lisp; Logo; Mathematica; MatLab; Miranda; Modula-2; Oberon; Pascal; Perl; PL/I; Prolog; Python; Rexx; SAS; Scheme; sed; Simula; Smalltalk; Snobol; SQL; Visual Basic; Visual C++; Linux and XML.) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g, a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL). Hardware logic may also be incorporated into display screens for implementing embodiments of the invention and which may be segmented display screens, analogue display screens, digital display screens, CRTs, LED screens, Plasma screens, liquid crystal diode screen, and the like.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. In a system for access control of commercial facilities in which individually coded credential devices are issued to one or more employees for providing access to said commercial facilities, a method for financial purchase transaction between a merchant and said employee, the method comprising:
    providing the merchant with a contactless reader device adapted to discern credential device codes in the credential device operative to provide access to the commercial facilities, wherein the credential device is issued to the employee; and
    in response to presentation of the credential device at the merchant reader device for the purposes of a financial purchase transaction:
        discerning a credential device code using the merchant reader device, wherein the credential device code provides access to the commercial facilities;
        communicating the credential device code, together with details of the financial purchase transaction, to a transaction facilitator;
        identifying a credit/debit account corresponding to said employee according to a stored database correlation with the credential device code; and
        processing the financial purchase transactions details against the identified credit/debit account in order to authorize the financial purchase transaction.

2. A method according to claim 1 in which the credential device comprises a coil antenna coupled to internal circuitry, and adapted to wirelessly communicate with the merchant reader device when located in the proximity thereof.

3. A method according to claim 1 further comprising recognising from the credential device code an employer of the employee.

4. A method according to claim 1 further including, following said step of discerning the credential device code, verifying that the credential device code is in a predefined format of codes stored on said credential devices.

5. A system for contactless financial purchase transactions for use with a plurality of individually coded credential devices issued to one or more employees for providing access to commercial facilities, the system comprising:
    a reader device located at a merchant, the reader device adapted to discern a credential device code when presented in the proximity thereof by said employee for the purposes of a financial purchase transaction, wherein the credential device code also provides access to the commercial facilities;

a transaction facilitator computing apparatus in remote communication with the reader device for receiving the credential device code discerned by the reader device together with financial purchase transaction details provided by the merchant, the transaction facilitator computing apparatus including a database storing correlation information between individual credential device codes and credit/debit account numbers;

wherein the transaction facilitator computing apparatus is adapted to:

communicate with the merchant reader device to obtain a credential device code and corresponding financial purchase transaction details;

translate the credential device code into a credit/debit account number through use of said database; and communicate the credit/debit account number together with the financial purchase transaction details to a credit/debit account issuer for transaction authorisation.

6. A system according to claim 5 in which the reader device is operative to verify that the credential device code is in a predefined format of codes stored on said credential devices, the reader device transmitting the credential device code to the transaction facilitator computing apparatus only if the verification is positive.

7. A method for enabling a contactless credential device for use in financial transactions, wherein the contactless credential device includes a stored credential device code number to provide access to one or more commercial facilities, the method comprising:

generating a unique identification code for the credential device, wherein the credential device is operative to provide access to the one or more commercial facilities;

registering the credential device code number and unique identification code in a database together with a credit/debit account number;

providing a merchant with a contactless reader device adapted to read the credential device stored code number;

in response to presentation of the credential device at the merchant reader device for the purposes of a financial transaction:

communicating the credential device stored code number read by the reader device, together with financial transaction details, to a transaction facilitator;

retrieving the unique identification code and/or credit/debit account number corresponding to the stored code number from the database; and communicating the retrieved unique identification code and/or credit/debit account number, together with the financial transaction details, to a credit/debit account issuer for transaction authorisation.

8. A method according to claim 7 in which the credential device is associated with an individual, and the unique identification code is generated using a code associated with an employer of the individual.

9. A method according to claim 7 in which the unique identification code is generated using one or more of:

a Bank Identification Number (BIN) range of a payment card associated with the credit/debit account;

access card manufacturer information; or an employee access card code number.

10. A transaction facilitator computing apparatus for facilitating contactless financial purchase transactions involving a plurality of individually coded credential devices issued to employees for providing access to commercial facilities;

the transaction facilitator computing device having:

(a) an interface for remote communication with a reader device located at a merchant, the reader device being adapted to discern a credential device code when presented in the proximity thereof by an employee for the purposes of a financial purchase transaction, wherein the credential device code also provides access to the commercial facilities and (b) a database storing correlation information between individual credential device codes and credit/debit account numbers;

wherein the transaction facilitator computing apparatus is adapted to:

receive from the reader device the credential device code discerned by the reader device together with financial purchase transaction details provided by the merchant;

translate the credential device code into a credit/debit account number through use of said database; and communicate the credit/debit account number together with the financial purchase transaction details to a credit/debit account issuer for transaction authorization.

11. A method performed by a transaction facilitator computing device for facilitating contactless financial purchase transactions involving a plurality of individually coded credential devices issued to one or more employees for providing access to commercial facilities;

the transaction facilitator computing device having:

(a) an interface for remote communication with a reader device located at a merchant, the reader device being adapted to discern a credential device code when presented in the proximity thereof by an employee for the purposes of a financial purchase transaction, wherein the credential device code also provides access to the commercial facilities, and (b) a database storing correlation information between individual credential device codes and credit/debit account numbers;

the method including the steps of the transaction facilitator computing apparatus:

receiving from the reader device the credential device code discerned by the reader device together with financial purchase transaction details provided by the merchant;

translating the credential device code into a credit/debit account number through use of said database; and communicating the credit/debit account number together with the financial purchase transaction details to a credit/debit account issuer for transaction authorization.

12. A reader device for location a merchant, the reader device being adapted to:

discern, upon the presentation to the proximity of the reader device of one of a plurality of individually coded credential devices issued to employees for providing access to commercial facilities, a corresponding credential device code, wherein the credential device code provides access to the commercial facilities, verify that the credential device code is in a predefined format of codes stored on said credential devices, and if the verification is positive, to transmit the credential device code together with financial purchase transaction details, to a remote transaction facilitator computing apparatus for initiating a payment using the credential device code and the financial purchase transaction details.

13. A method performed by a reader device located at a merchant, the method including the reader device:

discerning, upon the presentation to the proximity of the reader device of one of a plurality of individually coded credential devices issued to employees for providing access to commercial facilities, a corresponding credential device code, wherein the credential device code provides access to the commercial facilities, verifying that the credential device code is in a predefined format of codes stored on said credential devices, and if the verification is positive, transmitting the credential device code together with financial purchase transaction details, to a remote transaction facilitator computing apparatus for initiating a payment using the credential device code and the financial purchase transaction details.

* * * * *